(12) United States Patent
Wang et al.

(10) Patent No.: US 9,191,101 B2
(45) Date of Patent: Nov. 17, 2015

(54) OPTICAL LINE TRANSMISSION PROTECTION SYSTEM AND METHOD

(71) Applicant: Huawei Technologies Co., Ltd., Shenzhen, Guangdong (CN)

(72) Inventors: Hongqi Wang, Shenzhen (CN); Shixing Li, Shenzhen (CN); Jun Luo, Shenzhen (CN); Dejiang Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 68 days.

(21) Appl. No.: 14/136,911

(22) Filed: Dec. 20, 2013

(65) Prior Publication Data
US 2014/0112654 A1    Apr. 24, 2014

Related U.S. Application Data

(63) Continuation of application No. PCT/CN2011/076027, filed on Jun. 21, 2011.

(51) Int. Cl.
*H04B 10/032*   (2013.01)
*H04J 14/02*   (2006.01)

(52) U.S. Cl.
CPC .......... *H04B 10/032* (2013.01); *H04J 14/0291* (2013.01); *H04Q 2213/1301* (2013.01)

(58) Field of Classification Search
CPC .................... H04B 10/032; H04Q 2213/1301; H04J 14/0291; H04J 14/0293; H04J 14/0294; H04J 14/0295

USPC ............................................... 398/5, 7, 17, 20
See application file for complete search history.

(56) References Cited

U.S. PATENT DOCUMENTS

| | | | |
|---|---|---|---|
| 7,072,584 B1 | 7/2006 | Lichtman et al. | |
| 2001/0046344 A1* | 11/2001 | Hayashi et al. | 385/15 |
| 2005/0019031 A1 | 1/2005 | Ye et al. | |
| 2005/0094998 A1* | 5/2005 | Bernier et al. | 398/19 |
| 2005/0201749 A1* | 9/2005 | Wang et al. | 398/12 |

FOREIGN PATENT DOCUMENTS

| | | |
|---|---|---|
| CN | 1395382 A | 2/2003 |
| CN | 1731228 A | 2/2006 |
| CN | 1816977 A | 8/2006 |
| CN | 101005318 A | 7/2007 |
| CN | 101789827 A | 7/2010 |
| CN | 101826917 A | 9/2010 |

* cited by examiner

*Primary Examiner* — Dalzid Singh
(74) *Attorney, Agent, or Firm* — Leydig, Voit & Mayer, Ltd.

(57) ABSTRACT

The present invention discloses an optical line transmission protection system and method. In which, the optical line transmission protection system includes: at least one stage of optical line protection segment having a transmitting end provided with a Tunable Optical Divide Module (TOD), and a receiving end provided with an OSW; the transmitting end of a local Optical Line Protector (OLP) is connected to the receiving end of an opposite OLP to form main and standby optical lines; and the TOD is configured to set splitting ratios of the main and standby optical lines according to a difference between the optical fiber states of the current working channel and non-working channel, and tune optical power distributions at respective transmitting ends of the main and standby optical lines, according to the splitting ratios of the main and standby optical lines.

14 Claims, 3 Drawing Sheets

OPTICAL LINE TRANSMISSION PROTECTION SYSTEM AND METHOD

CROSS-REFERENCE TO RELATED APPLICATIONS

This application is a continuation of International Patent Application No. PCT/CN2011/076027, filed on Jun. 21, 2011, which is hereby incorporated by reference in its entirety.

TECHNICAL FIELD

The embodiments of the present invention relate to the field of communication technology, and particularly, to optical line transmission protection system and method.

BACKGROUND

In the 1+1 line protection, under the Optical Terminal Multiplexer (OTM)-OTM single-span or multi-span scenario, the transmitting end of the Optical Line Protector (OLP) uses the 50:50 coupler to perform an equal light splitting of the signal light and then transmits the split signal lights to the main and standby optical lines, while the receiving end of the OLP selects and receives the split signal light using an optical switch. Under the application scenario of OTM-OTM single-span or multi-span transmission, since the transmitting end uses the 50:50 coupler, the optical transmission line system introduces an extra loss about 3 dB. When the transmission distance of the optical transmission line system exceeds a certain value, the 3 dB loss will have a large influence on the performance of the optical transmission line system (the optical power budget at the receiving end and the signal-to-noise ratio), and thus, the configuration scheme of the optical transmission line system needs to be changed.

In order to solve the problem of 3 dB insertion loss introduced by the transmitting end of the OLP using the 50:50 coupler in the 1+1 line protection, the existing 1:1 line protection can be adopted. In the conventional art, the 50:50 coupler may be replaced with an Optical Switch (OSW) at the transmitting end of the OLP, and selectively transmit the signal light to the main or standby optical line, and the receiving end selects and receives the signal light using the OSW. However, a synchronous handover is required between upstream and downstream of the 1:1 line protection, thus the complicated handshake protocol shall be employed between the upstream and downstream of the 1:1 line protection. The upstream and downstream ensure the completion of the protection handover through multiple times of handshakes, thus the switching reliability is decreased, and the switching time is longer than that of the 1+1 line protection.

SUMMARY

The embodiments of the present invention provide an optical line transmission protection system and method, so as to eliminate the deficiency in the prior art that the lower switching reliability and the long switching time cannot be solved simultaneously, thereby simplifying the handshake process, improving the switching reliability, and reducing the switching time.

The embodiments of the present invention provide an optical line transmission protection system, comprising: at least one stage of an optical line protection segment having a transmitting end of a local Optical Line Protector (OLP) provided with a Tunable Optical Divide Module (TOD), and a receiving end of an opposite OLP provided with an Optical Switch (OSW);

the transmitting end of a local Optical Line Protector (OLP) is connected to the receiving end of an opposite OLP to form a main optical line and a standby optical line; and the TOD is configured to set splitting ratios of the main and standby optical lines according to a difference between optical fiber states of the current working channel and a current non-working channel, and tune optical power distributions at respective transmitting ends of the main and standby optical lines, according to the splitting ratios of the main and standby optical lines.

The embodiments of the present invention also provide an optical line transmission protection method, comprising:

setting, by a Tunable Optical Divide Module (TOD), splitting ratios of main and standby optical lines according to a difference between optical fiber states of a current working channel and a current non-working channel;

tuning optical power distributions at respective transmitting ends of the main and standby optical lines according to the splitting ratios of the main and standby optical lines; and transmitting, by the main and standby optical lines, corresponding optical signals according to respective optical power distributions of a main optical line and a standby optical line.

The optical line transmission protection system and method according to the embodiments of the present invention provide the TOD at the transmitting end of each OLP, so as to tune the optical power distributions at respective transmitting ends of the main and standby optical lines according to the splitting ratios of the current working channel and non-working channel, thereby reducing the insertion loss at the transmitting end T while ensuring a smooth service, thus the defect of 3 dB insertion loss in the 1+1 line protection is solved. In addition, since the transmitting end is provided with the TOD, only a unidirectional notification is required between the upstream and downstream OLPs, without employing the complicated handshake protocol of the 1:1 line protection, thereby simplifying the handshake process, improving the switching reliability, and reducing the switching time.

BRIEF DESCRIPTION OF DRAWINGS

In order to more clearly describe the technical solutions of the embodiments of the present invention or the prior art, the drawings to be used in the descriptions of the embodiments or the prior art are briefly introduced as follows. Obviously, the following drawings just illustrate some embodiments of the present invention, and a person skilled in the art can obtain other drawings from these drawings without paying a creative effort.

DESCRIPTION OF EMBODIMENTS

In order to make the objects, technical solutions and advantages of the present invention be clearer, the technical solutions of the embodiments of the present invention will be clearly and completely described as follows with reference to the drawings. Apparently, the described embodiments are just a part of embodiments of the present invention rather than all the embodiments. Based on the embodiments of the present invention, any other embodiment obtained by a person skilled in the art without paying a creative effort will fall within the protection scope of the present invention.

Embodiment 1

Figure 1A:
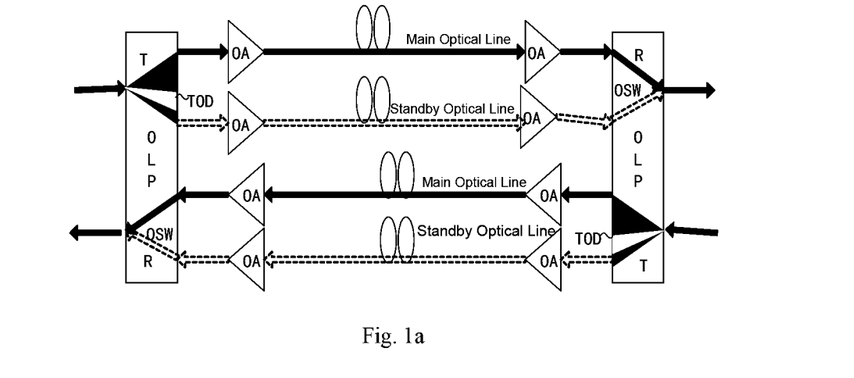
FIG. 1a is a structure diagram of an optical line transmission protection system according to Embodiment 1 of the present invention.

FIG. 1a is a structure diagram of an optical line transmission protection system according to Embodiment 1 of the present invention. As illustrated in FIG. 1a, the optical line transmission protection system may include at least one stage of optical line protection segment having a transmitting end provided with a Tunable Optical Divide Module (TOD), and a receiving end provided with an OSW; wherein one stage of optical line protection segment starts from one OLP to another OLP. One optical line protection segment may include one or more spans (e.g., between two Optical Amplifications (OA)). The TOD may preset splitting ratios for the main and standby optical lines in the current working channel, according to the difference between the optical fiber states of the current working channel and non-working channel During the handover, the TOD tunes the optical power distributions at respective transmitting ends of the main and standby optical lines, according to the splitting ratios preset for the main and standby optical lines in the current working channel.

The transmitting end T of the local OLP is connected to the receiving end R of the opposite OLP to form the main and standby optical lines. In which, the transmitting end T and the receiving end R may be connected to each other via two OAs for transmitting and receiving, wherein the number of the OAs may be set based on the specific application scenario, the minimum number is 0, and the maximum number is not limited.

In which, the OLP can protect the optical signals transmitted in optical transmission lines (main and standby optical lines) of the optical line transmission protection system from being influenced by various failures of the optical fibers. Thus the OLP can well protect the optical layers, furnish the protection function required by the network, and provide more effective protection for some particular network failures, such as node failure, link failure, channel failure, etc. The optical layer protection has the following advantages: high-speed, i.e., the optical layer can be recovered faster than other upper layer, and a node can quickly act without waiting for an instruction signal from the upper layer; simple, i.e., the recovery of the optical layer requires less coordination than that of the upper layer; high-efficient, i.e., since the resources are shared by different service layers, the optical layer can more effectively use the recovered resources; transparent, i.e., the wavelength routing protection is independent from the protocol used by the upper layer. The OSW is an optical element which has one or more optional transmission ports, and performs mutual handover or logic operation on the optical signals in the optical transmission line or the integrated optical circuit.

Figure 1B:
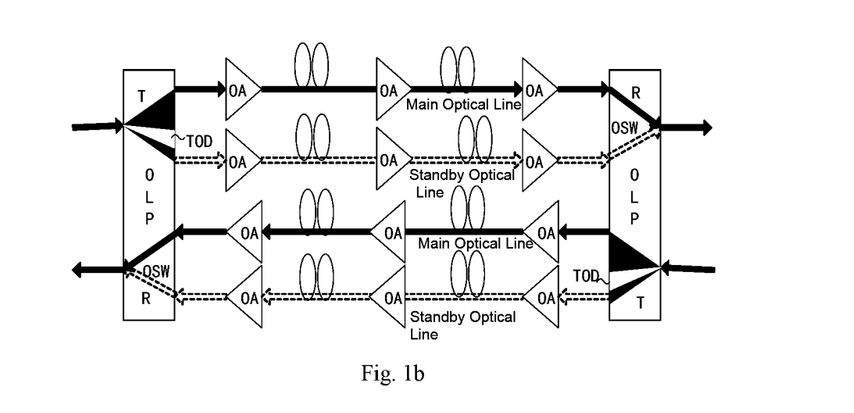
FIG. 1b is another structure diagram of an optical line transmission protection system according to Embodiment 1 of the present invention.
Figure 1C:
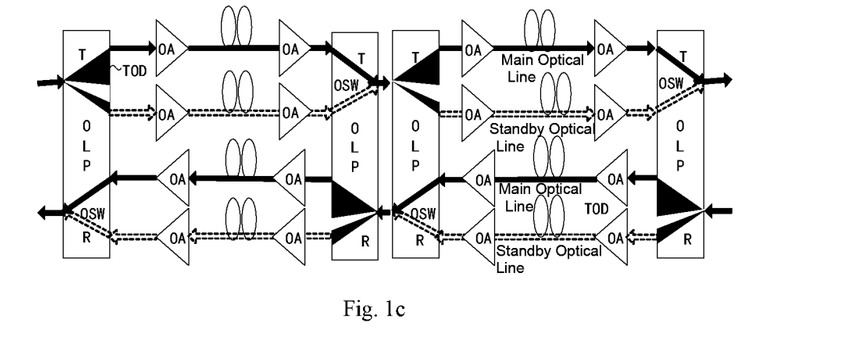
FIG. 1c is still another structure diagram of an optical line transmission protection system according to Embodiment 1 of the present invention.

Specifically, the optical line transmission protection system may be provided between the OTMs. In FIG. 1a, the optical line transmission protection system includes one stage of optical line protection segment, in which the transmitting end T of the local OLP is connected to the receiving end R of the opposite OLP through two OAs to form the main and standby optical lines, thus the optical line transmission protection system in FIG. 1a is a single-span system. FIG. 1b is another structure diagram of an optical line transmission protection system according to Embodiment 1 of the present invention. As illustrated in FIG. 1b, the optical line transmission protection system includes one stage of optical line protection segment, in which the transmitting end T of the local OLP is connected to the receiving end R of the opposite OLP through multiple OAs to form the main and standby optical lines, thus the optical line transmission protection system in FIG. 1b is a multi-span system. FIG. 1c is still another structure diagram of an optical line transmission protection system according to Embodiment 1 of the present invention. As illustrated in FIG. 1c, the optical line transmission protection system includes multiple stages of optical line protection segments. In a stage of optical line protection segment, the transmitting end T of the local OLP is connected to the receiving end R of the opposite OLP through two (or more) OAs to form the main and standby optical lines, thus the optical line transmission protection system in FIG. 1c is a cascade system, and there may be a single span (including two OAs) or multiple spans (including more than two OAs) between a pair of the transmitting end T and the receiving end R of the cascade system.

The TOD is configured to tune the optical power distributions at respective transmitting ends T of the main and standby optical lines, according to the splitting ratios for the current working channel and non-working channel The TOD may use a passive element, and distribute the input optical signal to different transmission ports on the transmitting end T of the OLP according to a certain proportion. The tuning function of the TOD may be implemented depending on the variation of the external voltage or current, so as to tune the splitting ratios of different transmission ports.

For example in FIG. 1a. the working principle of the optical line transmission protection system is as follows: at the transmitting end T of the local OLP, after being input to the TOD, the signal light is split into two paths (i.e., optical signals for the main and standby optical lines) by the TOD according to different splitting ratios for the current working channel and non-working channel, then the optical signals are transmitted to the receiving end R of the opposite OLP via the main and standby optical lines. At the receiving end R of the opposite OLP, two paths of optical signals are selected and received through the OSW. In which, when the OSW of the receiving end R is closed in the main optical line, the TOD of the transmitting end T tunes the splitting ratio of the main optical line to be higher, and tunes the splitting ratio of the standby optical line to be lower, thereby ensuring a smooth service when the OSW is handed over to the main optical line. In addition, since the splitting ratio of the main optical line is larger, the service quality of the main optical line is better. When the main optical line is abnormal, after the OSW of the receiving end R hands over the current working channel from the main optical line to the standby optical line, the optical power of the standby optical line can ensure a smooth service, but the service quality is not so good. Thus the receiving end R of the opposite OLP may transmit a tuning start command to the transmitting end T of the local OLP. After receiving the tuning start command, the transmitting end T may instruct the TOD of the local OLP to tune the splitting ratios for the main and standby optical lines, by decreasing the splitting ratio for the main optical line (e.g., decreasing from 70% to 40%) while increasing that of the standby optical line (e.g., increasing from 30% to 60%), thereby improving the service quality of the standby optical line. It is unnecessary to employ the complicated handshake protocol during the process, thus the switching can be correctly performed, and the service is ensured to be smooth.

The embodiment provides the TOD at the transmitting end T of each OLP, so as to tune the splitting ratios for optical power distributions at respective transmitting ends T of the main and standby optical lines according to the difference between the optical fiber states (e.g., attenuation, Polarization Mode Dispersion (PDM), etc.) of the current working channel and non-working channel, thereby reducing the insertion loss at the transmitting end T while ensuring a smooth service, thus the defect of 3 dB insertion loss in the 1+1 line protection is solved. In addition, since the transmitting end T is provided with the TOD, only a unidirectional notification is required between the upstream and downstream OLPs, without employing the complicated handshake protocol of the 1:1 line protection, thereby simplifying the handshake process, improving the switching reliability, and reducing the switching time.

Embodiment 2

Figure 2A:
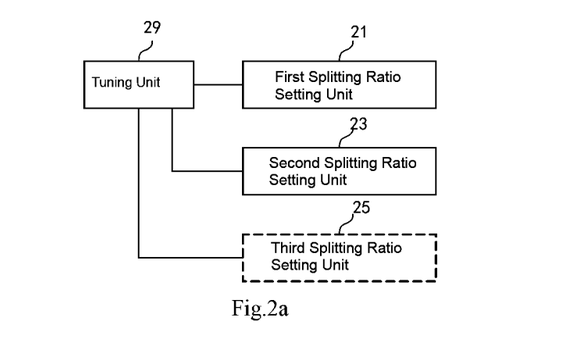
FIG. 2a is a structure diagram of an optical line transmission protection system according to Embodiment 2 of the present invention.

FIG. 2a is a structure diagram of an optical line transmission protection system according to Embodiment 2 of the present invention. As illustrated in FIG. 2a. based on Embodiment 1. the TOD may include any one or more of the following units:

a first splitting ratio setting unit 21 configured to set the splitting ratio of the standby optical line as a minimum splitting ratio thereof when the current working channel is the main optical line, and set the splitting ratio of the main optical line as a value obtained by "subtracting the minimum splitting ratio of the standby optical line from 1";

a second splitting ratio setting unit 23 configured to set the splitting ratio of the main optical line as a minimum splitting ratio thereof when the current working channel is the standby optical line, and set the splitting ratio of the standby optical line as a value obtained by "subtracting the minimum splitting ratio of the main optical line from 1"; and a third splitting ratio setting unit 25 configured to select a larger value from the minimum splitting ratio of the main optical line and the minimum splitting ratio of the standby optical line, set the splitting ratio of the current non-working channel as the larger value, and set the splitting ratio of the current working channel as a value obtained by "subtracting the larger value from 1".

Figure 2B:
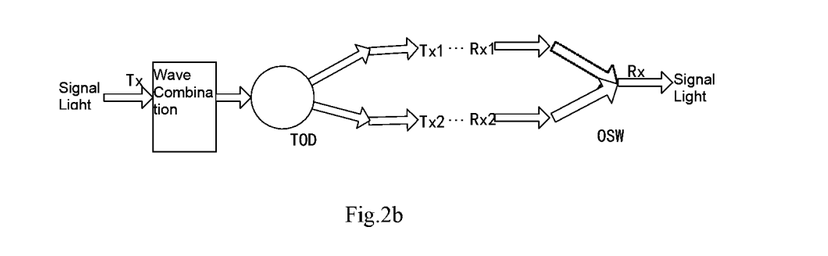
FIG. 2b is an application scenario diagram of an optical line transmission protection system according to Embodiment 2 of the present invention.

Specifically, referring to FIG. 2b. which is an application scenario diagram of an optical line transmission protection system according to Embodiment 2 of the present invention, wherein the splitting ratios of Tx1 port of the main optical line and Tx2 port of the standby optical line under different states may be set as follows:

Situation 1: when the service is received from Tx1 port of the main optical line, the splitting ratio of Tx2 port of the standby optical line is smaller. Assuming that B@A is the minimum splitting ratio of Tx2 port of the standby optical line allowable under the normal working condition, the splitting ratio of Tx1 port of the main optical line will be a value obtained by subtracting B@A from 1, and it is an optimal splitting ratio of the main optical line. This situation may be implemented by the first splitting ratio setting unit.

Situation 2: when the service is received from Tx2 port of the standby optical line, the splitting ratio of Tx1 port of the main optical line is smaller. Assuming that A@B is the minimum splitting ratio of Tx1 port of the main optical line allowable under the normal working condition, the splitting ratio of Tx2 port of the standby optical line will be a value obtained by subtracting A@B from 1, and it is an optimal splitting ratio of the standby optical line. This situation may be implemented by the second splitting ratio setting unit.

Situation 3: since the links of the main and standby optical lines often have different lengths, generally B@A≠A@B, and in order to decrease the judgment complexity, a larger one may be selected from the two values, i.e., the splitting ratio of the non-working channel is max (B@A, A@B). This situation may be implemented by the third splitting ratio setting unit.

Further, referring to FIG. 2a. the TOD further includes:

a tuning unit 29 configured to tune optical power distributions at respective transmitting ends of the main and standby optical lines according to the splitting ratios of the main and standby optical lines set in the current working channel, when the TOD receives a tuning start command returned by the receiving end.

Specifically, a power detection control unit of the receiving end of the opposite OLP may trigger the transmission of the tuning start command after the OSW is switched. After receiving the tuning start command returned by the receiving end of the opposite OLP, the tuning unit 29 of the TOD at the transmitting end of the local OLP can determine that the opposite OLP is handed over. This is because the scheme for tuning the splitting ratios of the main and standby optical lines has been preset, and the tuning may be directly carried out in the current working channel after the handover. For example, under one situation, if the current working channel after the handover is a main optical line, the tuning unit 29 may configure the optical power distributions at the transmitting ends of the main and standby optical lines according to the splitting ratios set by the first splitting ratio setting unit 21; and if the current working channel after the handover is a standby optical line, the tuning unit 29 may configure the optical power distributions at the transmitting ends of the main and standby optical lines according to the splitting ratios set by the second splitting ratio setting unit 23. Under another situation, the tuning unit 29 may configure the optical power distributions at the transmitting ends of the main and standby optical lines according to the splitting ratios set by the third splitting ratio setting unit 25, regardless of whether the current working channel after the handover is a main optical line or a standby optical line.

The embodiment provides the TOD at the transmitting end T of each OLP, so as to tune the splitting ratios for optical power distributions at respective transmitting ends T of the main and standby optical lines according to the difference between the optical fiber states of the current working channel and non-working channel, thereby reducing the insertion loss at the transmitting end T while ensuring a smooth service, thus the defect of 3 dB insertion loss in the 1+1 line protection is solved. In addition, since the transmitting end T is provided with the TOD, only a unidirectional notification is required between the upstream and downstream OLPs, without employing the complicated handshake protocol of the 1:1 line protection, thereby simplifying the handshake process, improving the switching reliability, and reducing the switching time.

Embodiment 3

Figure 3A:
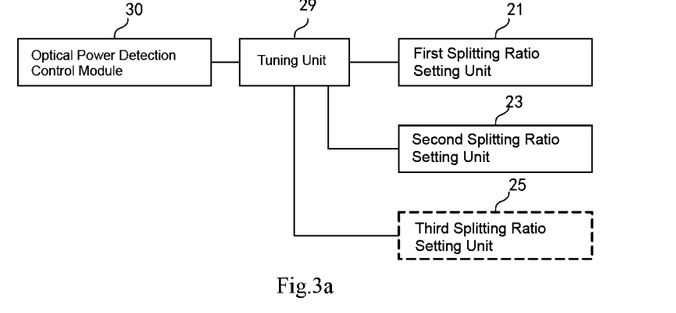
FIG. 3a is an application scenario diagram of an optical line transmission protection method according to Embodiment 3 of the present invention.

FIG. 3a is an application scenario diagram of an optical line transmission protection system according to Embodiment 3 of the present invention. When signal optical power detections are performed for the OLPs of the cascade system, the switching of the upstream OLP leads to a change of the downstream power, and in case the detection speeds are different, a wrong switching of the downstream OLP will be easily caused. In order to solve the problem of wrong switching in the cascade system, a reference light may be coupledly input at the transmitting end of the OLP, and then separated at the receiving end of the OLP for the optical power detection. The detections of the reference light and the signal light may be performed at the same time, and the two signals may be used to simultaneously judge whether the switching condition is satisfied, so as to solve the wrong switching in the cascade application. However, since the reference light is an independent signal and no system is formed between the OTMs, there is no effective scheme for reference light regeneration and transmission in a certain single span of the cascade application, and a normal protection cannot be realized. Thus as illustrated in FIG. 3a, the optical line transmission protection system may further include:

an optical power detection control module 30 configured to detect reference light power quality indexes of various optical line transmission protection systems. If the reference light power is preset as the switching judgment condition, a reference light power quality index may be taken as one switching judgment condition after it is detected, so as to perform the subsequent switching judgment together with other switching judgment conditions. Specifically, the presetting of the upper layer (e.g., gateway and server) may be taken as a switching judgment condition to determine whether the reference light power quality index shall participate in the switching judgment. If the reference light power is not preset as a switching judgment condition, a reference light power quality index will not be used as the switching judgment condition after it is detected, and the subsequent switching judgment may be performed according to other switching judgment condition. Thus, whether the reference light power quality index is taken as the switching judgment condition can be determined according to the specific application scenario, so as to flexibly configure it into various systems.

Figure 3B:
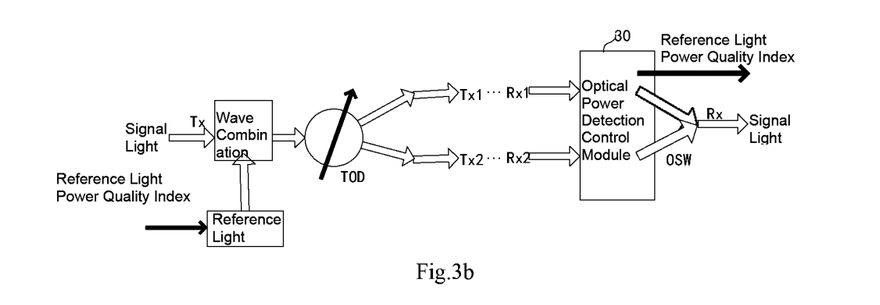
FIG. 3b is another application scenario diagram of an optical line transmission protection method according to Embodiment 3 of the present invention.

Specifically, FIG. 3b is another application scenario diagram of an optical line transmission protection system according to Embodiment 3 of the present invention. As illustrated in FIG. 3b, at the transmitting end Tx of one OLP, the signal light and the reference light are coupled and input into the TOD, which may split the combined light into two paths according to different splitting ratios, wherein the main optical line is connected to Tx1 port, and the standby optical line is connected to Tx2 port. At the receiving end Rx of the OLP, the combined light is transmitted from two lines (Tx1 port and Tx2 port) to two ports (Rx1 port of the main optical line and Rx2 port of the standby optical line) of the receiving end, respectively. After the two paths of combined light is processed by the optical power detection control module 30, the quality index signal of the reference light power is output and modulated into the downstream reference light. The signal light is transmitted to the receiving end Rx after being selected and received by the OSW, thus the reception of the signal light is completed.

For example, under the default state, the OSW of the receiving end is closed at Rx1 port of the main optical line. In that case, the TOD of the transmitting end tunes the splitting ratio at Tx1 port of the main optical line to be higher, and tunes the splitting ratio at Tx2 port of the standby optical line to be lower, thereby ensuring a smooth service when the OSW is handed over to the main optical line (the prior-correction bit error rate is larger). In addition, since the splitting ratio at Tx1 port is larger, the service quality is better. When the main optical line is abnormal, the OSW of the receiving end hands over to Rx2 port of the standby optical line. In that case, the optical power of the standby optical line can ensure a smooth service, but the service quality is not so good. Thus the receiving end may transmit a tuning start command to the transmitting end. After the transmitting end receives the tuning start command, the TOD tunes the splitting ratios of the main and standby optical lines, by decreasing the splitting ratio at Tx1 port while increasing the splitting ratio at Tx2 port. It is unnecessary to employ the complicated handshake protocol during the process, and the switching can be correctly performed.

Referring to FIG. 3b, the transmitting end Tx of the local OLP combines the signal light with the reference light, and transmits the combined light to the receiving end Rx of the opposite OLP through the main or standby optical line. The optical power detection control module 30 of the receiving end Rx of the opposite OLP may detect and obtain a reference light power quality index from the combined light, then determine whether the reference light power quality index shall participate in the switching condition judgment according to the presetting, and whether to transmit the reference light power quality index at the OLP, thereby solving the problem that a normal protection cannot be carried out since there is no effective scheme for reference light regeneration and transmission in the multiple spans, and simultaneously solving the problem of wrong switching in the cascade system. In which, the reference light power quality index may be variable under different scenarios as follows:

Scenario 1: in the single-span OLP between the OTMs, referring to FIG. 1a, the default value may be used and it is unnecessary to set to determine whether the reference light participates in the switching condition judgment, wherein the reference light power quality index and the optical signals of the main and standby optical lines all can be taken as the switching judgment conditions.

Scenario 2: in the multi-span OLP between the OTMs, referring to FIG. 1b, since the reference light of the OAs needs to be regenerated, the reference light power quality index of each OA shall be set as a valid value, and both the reference light power quality index and the signal light shall be taken as the switching judgment conditions.

Scenario 3: in the cascade OLP, referring to FIG. 1c, since the reference light power quality index between two adjacent OLPs at the middle is transmitted stage by stage and causes a downstream cascade switching, the reference light power quality index of the station where the two adjacent OLPs at the middle are located shall be set as an invalid value (i.e., unused or invalid) to prevent the cascade switching of the downstream OLP.

According to the above scenarios, the optical power detection control module may correspondingly include any one or more of the following units:

A single-span detection control unit configured to set a reference light power quality index of the single span of the optical line transmission protection system to be valid and serve as a default value; and determine, according to the detected default value, to use the reference light power quality index as a downstream switching judgment condition for the single span. The single-span detection control unit may be applied to the signal-span optical line as illustrated in FIG. 1a.

A multi-span detection control unit configured to set a reference light power quality index of the multi-span of the optical line transmission protection system as a valid value; and determine, according to the detected valid value, to use the reference light power quality index as a downstream switching judgment condition for the multi-span. The multi-span detection control unit may be applied to the multi-span optical line as illustrated in FIG. 1b. so as to solve the problem that the multi-span reference light needs to be regenerated.

A cascade detection control unit configured to set a reference light power quality index of the cascade OLP of the optical line transmission protection system as an invalid value; and determine, according to the detected invalid value, not to use the reference light power quality index as a downstream switching judgment condition for the multi-span, and not to perform the switching of the downstream cascade OLP. The cascade detection control unit may be applied to the cascade optical line as illustrated in FIG. 1c. so as to solve the problem of cascade switching.

The embodiment provides the TOD at the transmitting end of each OLP, so as to tune the optical power distributions at respective transmitting ends of the main and standby optical lines according to the splitting ratios of the current working channel and non-working channel, thereby reducing the insertion loss at the transmitting end T while ensuring a smooth service, thus the defect of 3 dB insertion loss in the 1+1 line protection is solved. In addition, since the transmitting end T is provided with the TOD, only a unidirectional notification is required between the upstream and downstream OLPs, and the service can be tuned to the optimal according to the received tuning start command, without employing the complicated handshake protocol of the 1:1 line protection, thereby simplifying the handshake process, improving the switching reliability, and reducing the switching time. Moreover, by transmitting the reference light power quality index to the downstream OLP, it can be determined whether the reference light shall be taken as a switching judgment condition. In the cascade system, the downstream OLP is enabled to identify whether the local OLP has any valid value when the reference light power quality index is transmitted to the downstream OLP, so as to prevent a wrong switching in conjunction with the optional settings, and further improve the switching reliability.

Embodiment 4

Figure 4:
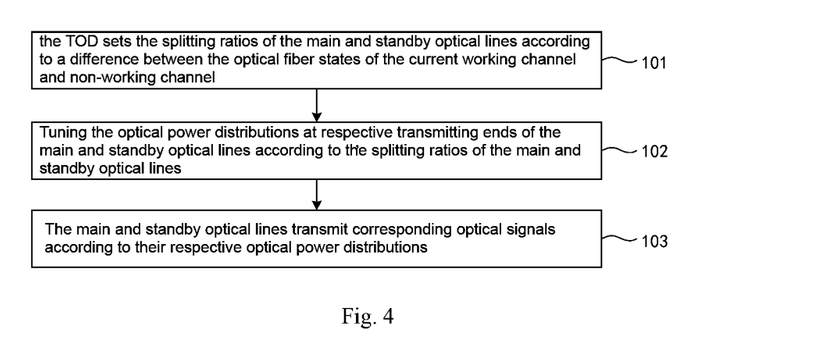
FIG. 4 is a flow diagram of an optical line transmission protection method according to Embodiment 4 of the present invention.

FIG. 4 is a flow diagram of an optical line transmission protection method according to Embodiment 4 of the present invention. As illustrated in FIG. 4, the optical line transmission protection method includes:

Step 101: the TOD sets the splitting ratios of the main and standby optical lines according to a difference between the optical fiber states of the current working channel and non-working channel.

In step 101, the minimum splitting ratios of the main and standby optical lines may be determined according to the optical fiber states such as attenuation and PMD of the main and standby optical lines, thus the step in which the TOD sets the splitting ratios of the main and standby optical lines according to the difference between the optical fiber states of the current working channel and non-working channel specifically may include any of the following situations:

Situation 1: if the current working channel is the main optical line, setting the splitting ratio of the standby optical line as a minimum splitting ratio thereof, and setting the splitting ratio of the main optical line as a value obtained by "subtracting the minimum splitting ratio of the standby optical line from 1"; or Situation 2: if the current working channel is the standby optical line, setting the splitting ratio of the main optical line as a minimum splitting ratio thereof, and setting the splitting ratio of the standby optical line as a value obtained by "subtracting the minimum splitting ratio of the main optical line from 1"; or Situation 3: selecting a larger value from the minimum splitting ratio of the main optical line and the minimum splitting ratio of the standby optical line, setting the splitting ratio of the current non-working channel as the larger value, and setting the splitting ratio of the current working channel as value obtained by "subtracting the larger value from 1".

Step 102: tuning the optical power distributions at respective transmitting ends of the main and standby optical lines according to the splitting ratios of the main and standby optical lines.

In which, step 102 specifically may include:

Tuning the splitting ratios of the optical power distributions at respective transmitting ends of the main and standby optical lines according to the splitting ratios of the main and standby optical lines set in the current working channel, and based on the difference between the optical fiber states of the current working channel and non-working channel, when the TOD receives a tuning start command returned by the receiving end.

Step 103: the main and standby optical lines transmit corresponding optical signals according to their respective optical power distributions.

Further, in order to reduce the influence on the optical line transmission protection system by the reference light detection, the optical line transmission protection method may further include: detecting reference light power quality indexes of various optical line transmission protection systems; if the reference light power is preset as the switching judgment condition, a reference light power quality index may be taken as one switching judgment condition after it is detected, so as to perform the subsequent switching judgment together with other switching judgment conditions; if the reference light power is not preset as a switching judgment condition, a detected reference light power quality index will not be used as a switching judgment condition after it is detected, and the subsequent switching judgment may be performed according to other switching judgment condition. Specifically, the following scenarios may be included:

Scenario 1: setting the reference light power quality index of the single span of the optical line transmission protection system as a default value; and determining, according to the detected default value, to use the reference light power quality index as a downstream switching judgment condition for the single span. Scenario 1 may be applied to the signal-span optical line as illustrated in FIG. 1a; or Scenario 2: setting the reference light power quality index of the multi-span of the optical line transmission protection system as a valid value; and determining, according to the detected valid value, to use the reference light power quality index as a downstream switching judgment condition for the multi-span. Scenario 2 may be applied to the multi-span optical line as illustrated in FIG. 1b, so as to solve the problem that the multi-span reference light needs to be regenerated; or Scenario 3: setting the reference light power quality index of the cascade OLP of the optical line transmission protection system as an invalid value; and determining, according to the detected invalid value, not to use the reference light power quality index as a downstream switching judgment condition for the multi-span, and not to perform the switching of the downstream cascade OLP. Scenario 3 may be applied to the cascade optical line as illustrated in FIG. 1c, so as to solve the problem of cascade switching.

The embodiment provides the TOD at the transmitting end of each OLP, so as to tune the optical power distributions at respective transmitting ends of the main and standby optical lines according to the difference between the optical fiber states (e.g., attenuation, PDM, etc.) of the current working channel and non-working channel, thereby reducing the insertion loss at the transmitting end while ensuring a smooth service, thus the defect of 3 dB insertion loss in the 1+1 line protection is solved. In addition, since the transmitting end is provided with the TOD, only a unidirectional notification is required between the upstream and downstream OLPs, without employing the complicated handshake protocol of the 1:1 line protection, thereby simplifying the handshake process, improving the switching reliability, and reducing the switching time. Moreover, by transmitting the reference light power quality index to the downstream OLP, it can be determined whether the reference light shall be taken as a switching judgment condition. In the cascade system, the downstream OLP is enabled to identify whether local OLP has any valid value when the reference light power quality index is transmitted to the downstream OLP, so as to prevent a wrong switching in conjunction with the optional settings, and further improve the switching reliability. The embodiment effectively solves the problems of multi-span protection and cascade application protection, thus the application range of the line protection is more extensive.

The optical line transmission protection system and method in the embodiments of the present invention may be applied to the communication fields, such as WDM system, SDH system, mobile communication system, etc.

A person skilled in the art shall be appreciated that all or a part of steps for implementing the above method embodiments may be completed by instructing relevant hardware through a program that may be stored in a computer readable storage medium, and when being executed, the program performs the steps including the above method embodiments. The storage medium may include various mediums capable of storing program codes, such as ROM, RAM, magnetic disk and optical disk.

Finally to be noted, the above embodiments are just used to describe, rather than limiting, the technical solutions of the present invention. Although the present invention is detailedly described with reference to the aforementioned embodiments, a person skilled in the art shall be appreciated that the technical solutions of the aforementioned embodiments can be modified, or some technical features thereof can be equivalently replaced. Those modifications or replacements do not make essences of corresponding technical solutions deviate from the spirit and scope of the technical solution of each embodiment of the present invention.

What is claimed is:

1. An optical line transmission protection system, comprising:
    at least one stage of an optical line protection segment having a transmitting end of a local Optical Line Protector (OLP) provided with a Tunable Optical Divide Module (TOD), and a receiving end of an opposite OLP provided with an Optical Switch (OSW); the transmitting end is connected to the receiving end to form a main optical line and a standby optical line; and
    the TOD is configured to set splitting ratios of the main optical line to be higher and set the splitting ratio of the standby optical line to be lower when the main optical line is a current working channel, and set the splitting ratio of the standby optical line to be higher and set the splitting ratio of the main optical line to be lower after the transmitting end receiving a tuning start command from the receiving end, and tune optical power distributions at respective transmitting ends of the main and standby optical lines, according to the splitting ratios of the main and standby optical lines; wherein optical power of the standby optical line can ensure a smooth service when the main optical line is the current working channel.

2. The optical line transmission protection system according to claim 1, further comprising:
    an optical power detection control module configured to detect reference light power quality indexes of various optical line transmission protection systems; and if a reference light power is preset as a switching judgment condition, take a reference light power quality index as the switching judgment condition after the reference light power quality index is detected, so as to perform subsequent switching judgment together with other switching judgment conditions.

3. The optical line transmission protection system according to claim 2, wherein the optical power detection control module is further configured not to take the reference light power quality index as the switching judgment condition after the reference light power quality index is detected, if the reference light power is not preset as the switching judgment condition, and perform the subsequent switching judgment according to the other switching judgment conditions.

4. The optical line transmission protection system according to claim 3, wherein the optical power detection control module comprises one or more of the following units:
    a single-span detection control unit configured to set a reference light power quality index of a single span of the optical line transmission protection system to be valid and serve as a default value; and determine, according to the default value, to use the reference light power quality index of the single span as a downstream switching judgment condition for the single span;
    a multi-span detection control unit configured to set a reference light power quality index of a multi-span of the optical line transmission protection system as a valid value; and determine, according to the valid value, to use the reference light power quality index of the multi-span as a downstream switching judgment condition for the multi-span; and
    a cascade detection control unit configured to set a reference light power quality index of a cascade OLP of the optical line transmission protection system as an invalid value; and determine, according to the invalid value, not to use the reference light power quality index of the cascade OLP as a downstream switching judgment condition for the multi-span, and not to perform switching of a downstream cascade OLP.

5. The optical line transmission protection system according to claim 2, wherein the optical power detection control module comprises one or more of the following units:
    a single-span detection control unit configured to set a reference light power quality index of a single span of the optical line transmission protection system to be valid and serve as a default value; and determine, according to the default value, to use the reference light power quality index of the single span as a downstream switching judgment condition for the single span;

a multi-span detection control unit configured to set a reference light power quality index of a multi-span of the optical line transmission protection system as a valid value; and determine, according to the valid value, to use the reference light power quality index of the multi-span as a downstream switching judgment condition for the multi-span; and a cascade detection control unit configured to set a reference light power quality index of a cascade OLP of the optical line transmission protection system as an invalid value; and determine, according to the invalid value, not to use the reference light power quality index of the cascade OLP as a downstream switching judgment condition for the multi-span, and not to perform switching of a downstream cascade OLP.

6. An optical line transmission protection system, comprising: at least one stage of an optical line protection segment having a transmitting end of a local Optical Line Protector (OLP) provided with a Tunable Optical Divide Module (TOD), and a receiving end of an opposite OLP provided with an Optical Switch (OSW);

the transmitting end is connected to the receiving end to form a main optical line and a standby optical line; and the TOD is configured to set splitting ratios of the main and standby optical lines according to a difference between optical fiber states of a current working channel and a current non-working channel, and tune optical power distributions at respective transmitting ends of the main and standby optical lines, according to the splitting ratios of the main and standby optical lines;

wherein the TOD comprises any one or more of the following units:

a first splitting ratio setting unit configured to set the splitting ratio of the standby optical line as a minimum splitting ratio of the standby optical line when the current working channel is a main optical line, and set the splitting ratio of the main optical line as a value obtained by subtracting the minimum splitting ratio of the standby optical line from 1;

a second splitting ratio setting unit configured to set a splitting ratio of the main optical line as a minimum splitting ratio of the main optical line when the current working channel is the standby optical line, and set the splitting ratio of the standby optical line as a value obtained by subtracting the minimum splitting ratio of the main optical line from 1; and a third splitting ratio setting unit configured to select a larger value from the minimum splitting ratio of the main optical line and the minimum splitting ratio of the standby optical line, set the splitting ratio of the current non-working channel as the larger value, and set the splitting ratio of the current working channel as a value obtained by subtracting the larger value from 1.

7. The optical line transmission protection system according to claim 6, wherein the TOD further comprises:

a tuning unit configured to tune the optical power distributions at the respective transmitting ends of the main and standby optical lines according to the splitting ratios of the main and standby optical lines set in the current working channel, when the TOD receives a tuning start command returned by the receiving end.

8. An optical line transmission protection method, comprising:

setting, by a Tunable Optical Divide Module (TOD), a splitting ratio of a main optical line to be higher and set a splitting ratio of a standby optical line to be lower when the main optical line is a current working channel, and the splitting ratio of the standby optical line to be higher and set the splitting ratio of the main optical to be lower after the transmitting end receiving a tuning start command from the receiving end, wherein optical power of the standby optical line can ensure a smooth service when the main optical line is the current working channel;

tuning optical power distributions at respective transmitting ends of the main and standby optical lines according to the splitting ratios of the main and standby optical lines; and transmitting, by the main and standby optical lines, corresponding optical signals according to respective optical power distributions of a main optical line and a standby optical line.

9. The optical line transmission protection method according to claim 8, further comprising:

detecting reference light power quality indexes of various optical line transmission protection systems, if reference light power is preset as a switching judgment condition, taking a reference light power quality index as the switching judgment condition after the reference light power quality index is detected, so as to perform subsequent switching judgment together with other switching judgment conditions; or, if the reference light power is not preset as the switching judgment condition, performing the subsequent switching judgment according to the other switching judgment conditions without taking the detected reference light power quality index as the switching judgment condition after the reference light power quality index is detected.

10. The optical line transmission protection method according to claim 9, wherein when the reference light power is preset as the switching judgment condition, the taking the reference light power quality index as the switching judgment condition after the reference light power quality index is detected comprises:

setting a reference light power quality index of a single span of an optical line transmission protection system to be valid and serve as a default value; and determining, according to the default value, to use the reference light power quality index of the single span as a downstream switching judgment condition for the single span; or setting a reference light power quality index of a multi-span of the optical line transmission protection system as a valid value; and determining, according to the valid value, to use the reference light power quality index of the multi-span as a downstream switching judgment condition for the multi-span; or setting a reference light power quality index of a cascade Optical Line Protector (OLP) of the optical line transmission protection system as an invalid value; and determining, according to the invalid value, not to use the reference light power quality index as the downstream switching judgment condition for the multi-span, and not to perform switching of a downstream cascade OLP.

11. The optical line transmission protection method according to claim 9, wherein when the reference light power is not preset as the switching judgment condition, the performing the subsequent switching judgment according to the other switching judgment conditions comprises:

setting a reference light power quality index of a single span of an optical line transmission protection system to be valid and serve as a default value; and determining, according to the default value, to use the reference light power quality index of the single span as a downstream switching judgment condition for the single span; or setting a reference light power quality index of a multi-span of the optical line transmission protection system as a valid value; and determining, according to the valid value, to use the reference light power quality index of the multi-span as a downstream switching judgment condition for the multi-span; or setting a reference light power quality index of a cascade Optical Line Protector (OLP) of the optical line transmission protection system as an invalid value; and determining, according to the invalid value, not to use the reference light power quality index as the downstream switching judgment condition for the multi-span, and not to perform switching of a downstream cascade OLP.

12. An optical line transmission protection method, comprising:

setting, by Tunable Divide Module (TOD), splitting ratios of main and standby optical lines according to a difference between optical fiber states of a current working channel and a current non-working channel;

tuning optical power distributions at respective transmitting ends of the main and standby optical lines according to the splitting ratios of the main and standby optical lines; and transmitting, by the main and standby optical lines, corresponding optical signals according to respective optical power distributions of the main optical line and the standby optical line;

wherein the setting, by the TOD, the splitting ratios of the main and standby optical lines comprises at least one of the following (a), (b) and (c):

(a) if the current working channel is the main optical line, setting the splitting ratio of the standby optical line as a minimum splitting ratio of the standby optical line, and setting the splitting ratio of the main optical line as a value obtained by subtracting the minimum splitting ratio of the standby optical line from 1;

(b) if the current working channel is the standby optical line, setting the splitting ratio of the main optical line as a minimum splitting ratio of the main optical line, and setting the splitting ratio of the standby optical line as a value obtained by subtracting the minimum splitting ratio of the main optical line from 1; and (c) selecting a larger value from the minimum splitting ratio of the main optical line and the minimum splitting ratio of the standby optical line, setting the splitting ratio of the current non-working channel as the larger value, and setting the splitting ratio of the current working channel as a value obtained by subtracting the larger value from 1.

13. The optical line transmission protection method according to claim 12, wherein the tuning the optical power distributions at the respective transmitting ends of the main and standby optical lines according to the splitting ratios of the main and standby optical lines comprises:

if the TOD receives a tuning start command returned by the receiving end, tuning the optical power distributions at the respective transmitting ends of the main and standby optical lines according to the splitting ratios of the main and standby optical lines set in the current working channel.

14. The optical line transmission protection method according to claim 12, further comprising:

detecting reference light power quality indexes of various optical line transmission protection systems, if reference light power is preset as a switching judgment condition, taking a reference light power quality index as the switching judgment condition after the reference light power quality index is detected, so as to perform subsequent switching judgment together with other switching judgment conditions; or, if the reference light power is not preset as the switching judgment condition, performing the subsequent switching judgment according to the other switching judgment conditions without taking the detected reference light power quality index as the switching judgment condition after the reference light power quality index is detected.

* * * * *